Nov. 5, 1935.　　　　E. C. HORTON　　　　2,020,244
WINDSHIELD WIPER ARM MOUNTING
Filed Feb. 2, 1933
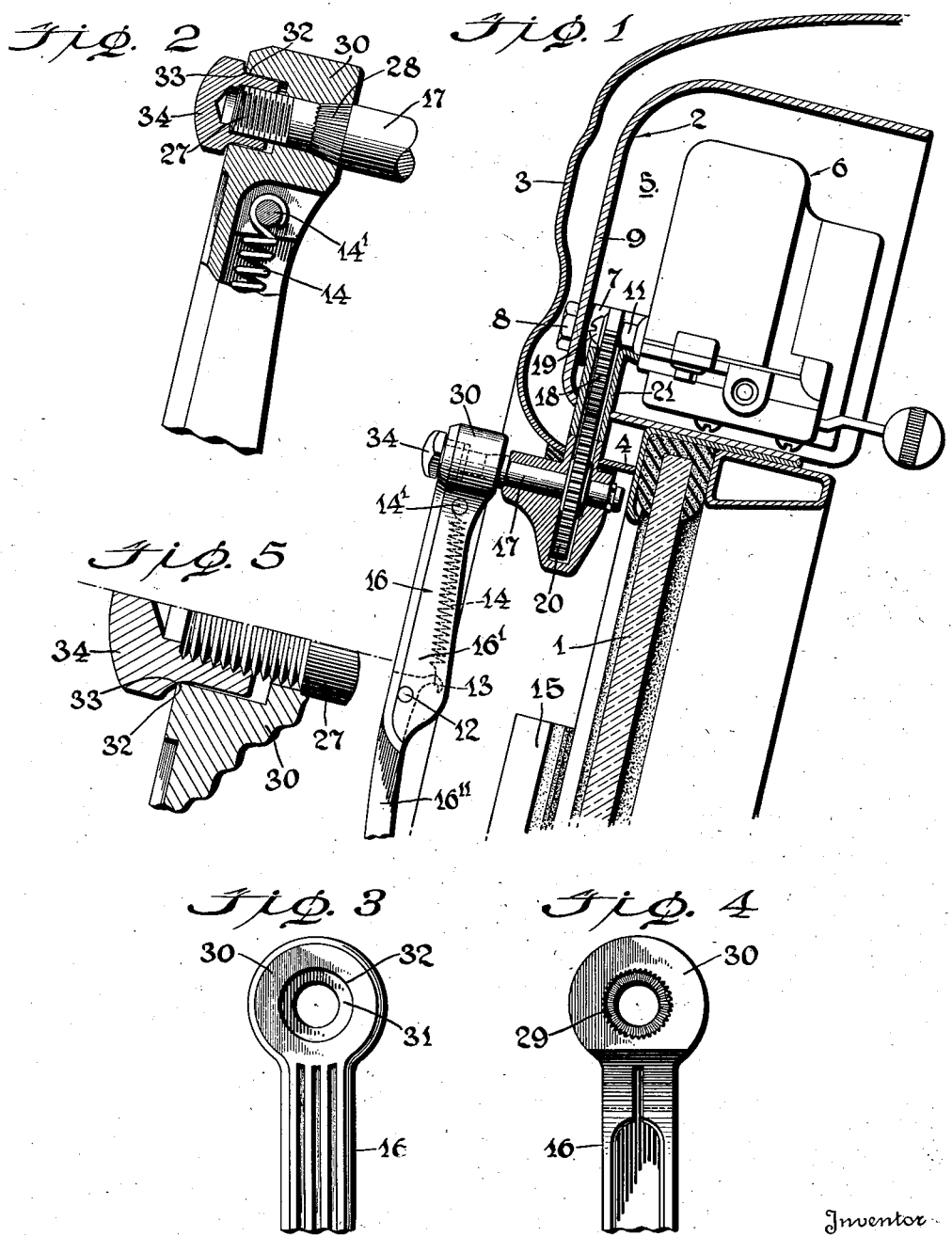
Inventor
Erwin C. Horton
By Beau & Brooks. Attorneys Patented Nov. 5, 1935

2,020,244

UNITED STATES PATENT OFFICE 2,020,244

WINDSHIELD WIPER ARM MOUNTING

Erwin C. Horton, Hamburg, N. Y., assignor to Trico Products Corporation, Buffalo, N. Y.

Application February 2, 1933, Serial No. 654,947

1 Claim. (Cl. 287—52.02)

This invention relates to a windshield wiper assembly and more particularly to an improved wiper blade carrying arm and its mounting on the actuating shaft of the windshield cleaner.

An object of the present invention is to provide a more durable and ornate wiper arm, and a more secure mounting therefor. Further, it is an object to provide a mounting permitting adjustability of the arm for cleaning a predetermined zone on the windshield.

In the drawing:

Fig. 1 represents a section through a windshield and parts of the vehicle body framing the windshield with certain parts in elevation.

Fig. 2 is an enlarged fragmentary view, partly in section, showing the mounting of the blade carrying arm upon its actuating arm.

Fig. 3 is a fragmentary view of the upper face portion of the windshield wiper arm.

Fig. 4 is the upper reverse portion of the same.

Fig. 5 is an enlarged fragmentary view showing more clearly the locking securement of the clamping nut in the wiper mounting.

Referring more particularly to the drawing, the numeral 1 designates the windshield of a motor vehicle above which is disposed the framing header bar construction herein depicted as embodying a transverse channeled frame member 2 and a roof frame member 3 which extends down over the front of the channel member so as to afford a neat trim and finish for the motor vehicle, said trim member being extended beneath the channel member and inwardly against the windshield as indicated at 4.

The channel member 2 is disposed on its side with its channel open rearwardly and thereby providing a readily accessible chamber 5 for housing the windshield cleaner motor 6. This motor is provided with suitable means for mounting it within the chamber, such as the ears 7 through which bolts 8 pass into the front wall 9 of the chamber.

The windshield cleaner motor is provided with an oscillating shaft 11. The wiper element or blade 15 is carried back and forth through an arcuate path by an arm 16 fixed to and oscillated by an actuating shaft 17. This shaft is journaled preferably at the underside of the header construction so that the axis of oscillation for the wiper arm 16 will be approximately at the upper edge of the transparent area of the windshield, thereby enabling a greater sweep for the wiper blade, even through an arc approximately 180° if desired. The wiper actuating shaft 17 is connected to the motor shaft 11 by a transmission which extends the drive downwardly from the motor through a passageway in the header construction. In the form illustrated, this transmission comprises a drive gear 18 fixed to the motor shaft 11, as by set screw 19, and a gear 20 fixed on the wiper shaft and meshing with the former gear, these two gears extending through openings provided in the bottom wall or chamber 5 and the extended portion 4 of the trim 3. These gears are enclosed within a housing 21.

In order to assemble the windshield wiper arm upon the actuating shaft 17 readily and expeditiously, shaft 17 is provided with a reduced threaded end 27 and preferably a sloping knurled or milled shoulder 28 for engagement with a flared interiorly milled portion 29 formed in head 30 of the wiper arm 16. Arm 16 is held tightly assembled with shaft 17 by a clamping nut 34 engaged with the threaded end 27. This nut may be received within a recessed or countersunk portion 31 in the outer face of the head 30 and is secured locked against unauthorized displacement by the biting engagement of the sharp or abrupt edge 32 of the counterbore with the overhanging shoulder portion 32 of the nut 34.

It can be readily seen, therefore, that when the nut 34 is tightened upon the threaded reduced end 27 of shaft 17 firm securement of the arm 16 on the shaft 17 is effected which engagement is tight and permanent by virtue of the binding effect produced by the sharp edges 32 of head 30 on the sloping portion 33 of head 30 on the sloping portion 33 of the assembly nut 34. In certain cases it has been found advantageous to use a nut 34 of a material softer than the material of the head 30 to facilitate the biting effect of the sharp edge 32 into the sloping portion 33 of the nut, even though such effect does occur where both elements are of the same composition.

A tight assembly of the wiper arm and shaft is assured which is not loosened nor disengaged by the incessant vibration of the parts occasioned by the operation of the vehicle to which they are attached.

The arm mounting is capable of adjustability, enabling the arm to sweep over a predetermined arcuate area about the shaft without resorting to a change in the motor mounting such as is essential in the former mountings wherein the actuating shaft is provided with a transverse opening and the arm of wire formation is passed therethrough. Furthermore, with this mounting the arm may be cast or otherwise formed more durable in character for giving greater service.

In effecting adjustment of the wiper arm about the shaft 17 the head 30 has its serrations 29 disengaged from the shaft serrations 28 and after the desired adjustment has been made these cooperating serrations or projections are re-engaged or interlocked with each other and the clamping nut 34 set. These serrations provide a positive interlock between the arm and its carrying shaft. The serrations on either the arm or shaft may be eliminated if desired since the serrations on one member will bite into the plane surface on the companion member to effect the desired interlock. Especially is this true where the non-serrated member is formed of a softer material. These serrations may be of any desired form and number since they merely constitute interlocking projectings and with this in mind the term "serrations" has been used broadly.

The particular wiper arm construction embodies a fixed section 16' and a movable section 16" pivotally connected thereto by a pin 12. The outer section is also provided with a short arm 13 to which the lower end of a spring 14 is secured, the upper end of the spring being connected by a pin 14' carried by the fixed section 16'. The function of this spring is to urge the lower or free end of the section 16", which carries the wiper blade 15, inwardly toward the windshield glass 1. It will be observed that the clamping nut 34, in effecting the interlock between the serrations 28 and 29, moves the fixed arm section 16' toward the windshield glass and thereby places the outer section 16" under the proper tension of the spring 14.

What is claimed is:

A wiper arm mounting for windshield cleaners, having an actuating shaft provided with a shoulder and an adjacent threaded end portion, a wiper actuating arm having an opening therethrough to receive such end portion of the shaft for seating the arm on said shoulder, the outer end portion of the arm opening being counterbored, the side wall of such counterbore extending substantially parallel to the axis of the threaded portion and spaced therefrom, and a centering nut engaging the threaded portion and having a sleeve-like extension freely received within the counterbore to guidingly support the arm during the tightening of the nut, said nut outwardly of such guiding sleeve extension having a part overhanging the arm about the counterbore for binding and centering engagement with the outer edge of such counterbore, said guiding sleeve extension having its peripheral portion extending substantially parallel with the axis of the threaded portion of the shaft and with the side wall of the counterbore and disposed in proximity to such side wall to serve in guidingly supporting the arm in proper alignment preliminary to binding engagement of the overhanging part with the arm, whereby to insure the binding engagement being properly centered as the nut is finally turned.

ERWIN C. HORTON.